(12) United States Patent
Diel (10) Patent No.: US 12,441,975 B2
(45) Date of Patent: Oct. 14, 2025

(54) BIOPROCESSING INSTALLATION (71) Applicant: Sartorius Stedim Biotech GmbH, Goettingen (DE)

(72) Inventor: Bernhard Diel, Dransfeld (DE)

(73) Assignee: Sartorius Stedim Biotech GmbH, Goettingen (DE)

( * ) Notice: Subject to any disclaimer, the term of this patent is extended or adjusted under 35 U.S.C. 154(b) by 597 days.

(21) Appl. No.: 17/288,810

(22) PCT Filed: Jan. 7, 2020

(86) PCT No.: PCT/EP2020/050212
§ 371 (c)(1),
(2) Date: Apr. 26, 2021

(87) PCT Pub. No.: WO2020/144184
PCT Pub. Date: Jul. 16, 2020

(65) Prior Publication Data
US 2022/0002656 A1 Jan. 6, 2022

(30) Foreign Application Priority Data
Jan. 8, 2019 (DE) .................... 10 2019 100 339.3

(51) Int. Cl.
*C12M 1/36* (2006.01)
*C12M 1/00* (2006.01)
*C12M 1/107* (2006.01)

(52) U.S. Cl.
CPC ............ *C12M 41/48* (2013.01); *C12M 23/26* (2013.01); *C12M 23/28* (2013.01); *C12M 23/34* (2013.01);
(Continued)

(58) Field of Classification Search
CPC ...... C12M 41/48; C12M 23/26; C12M 23/28; C12M 23/34; C12M 23/36; C12M 29/02; C12M 29/14; C12M 47/10
(Continued)

(56) References Cited

U.S. PATENT DOCUMENTS 6,325,572 B1  12/2001  Dietrich
6,844,006 B1  1/2005   Winstrom
(Continued)

FOREIGN PATENT DOCUMENTS

CN  103443262  12/2013
DE    2721226  12/1977
(Continued)

OTHER PUBLICATIONS

WO-2017025210-A1 Description (Year: 2017).*
(Continued)

*Primary Examiner* — Michael L Hobbs
*Assistant Examiner* — Lenora A Abel
(74) *Attorney, Agent, or Firm* — Pauly, DeVries Smith & Deffner LLC (57) ABSTRACT

Embodiments relate to a bioprocessing system having a main line for conduction of a main flow of a liquid medium, having a main flow pump and having a system part connected to the main line. The bioprocessing system comprises a powder transfer system and a feed line which is connected to the powder transfer system and which opens into the main line and which comprises a return flow preventer for prevention of a return flow of liquid medium, the powder transfer system feeds the additive into the feed line in powder form and drives it toward the feed point by means of a pressurized transport gas and at least some of the fed additive is input into the liquid medium within the main line downstream of the feed point before the liquid medium
(Continued)

enriched with the additive passes through or reaches the system part connected to the main line.

20 Claims, 2 Drawing Sheets

(52) U.S. Cl.
CPC ............ *C12M 23/36* (2013.01); *C12M 29/02* (2013.01); *C12M 29/14* (2013.01); *C12M 47/10* (2013.01)

(58) Field of Classification Search
USPC ...................................... 435/286.6
See application file for complete search history.

(56) References Cited

U.S. PATENT DOCUMENTS

| | | | |
|---|---|---|---|
| 9,315,281 B2* | 4/2016 | Dissanayake | B65B 3/22 |
| 2004/0245124 A1 | 12/2004 | Hurst | |
| 2008/0095676 A1* | 4/2008 | Andretta | B01J 19/0046 |
| | | | 422/600 |
| 2016/0348061 A1* | 12/2016 | Diel | C12M 37/02 |

FOREIGN PATENT DOCUMENTS

| | | |
|---|---|---|
| DE | 102006052669 | 5/2008 |
| DE | 102011119816 | 6/2013 |
| DE | 102016000979 | 8/2017 |
| EP | 0189378 | 7/1986 |
| EP | 3118145 | 1/2017 |
| GB | 979675 | 1/1965 |
| JP | 2010263135 | 11/2010 |
| KR | 19980036678 | 8/1998 |
| TW | M534969 | 1/2017 |
| WO | WO-2017025210 A1 * | 2/2017 ............ C12M 47/10 |
| WO | 2020144184 | 7/2020 |

OTHER PUBLICATIONS

"Downstream Processing," Wikipedia article retrieved from URL accessed at <https://en.wikipedia.org/wiki/Downstream_processing> on Oct. 15, 2019 (2 pages).
"German Search Report," for German Patent Application No. 102019100339.3 mailed Oct. 21, 2019 (8 pages).
"International Search Report and Written Opinion," for PCT Application No. PCT/EP2020/050212 mailed Apr. 9, 2020 (13 pages).
"Office Action," from Chinese Patent Application No. 202080008446.2 mailed Oct. 23, 2023 (11 pages), no English translation.

* cited by examiner

Fig. 1

Fig. 2

BIOPROCESSING INSTALLATION

CROSS-REFERENCE TO RELATED APPLICATIONS

This application is a national stage application under 35 U.S.C. 371 of International Patent Application Serial No. PCT/EP2020/050212, entitled "Bioprocessing System," filed Jan. 7, 2020, which claims priority from German Patent Application No. DE 10 2019 100 339.3, filed Jan. 8, 2019, the disclosure of which is incorporated herein by reference.

FIELD OF THE TECHNOLOGY

The disclosure relates to a bioprocessing system, to a method for operation of such a bioprocessing system and to the use of a sterile-packed transfer set for construction of such a bioprocessing system.

BACKGROUND

A bioprocessing system is understood here very generally to mean an installation with which biotechnological processes can be carried out or supported. For example, a bioprocessing system comprises a bioreactor, downstream of which is a so-called downstream system for the discharge and possibly further treatment of the fermentation broth generated in the bioreactor.

In the case of the known bioprocessing system (DE 10 2011 119 816 A1) from which the disclosure proceeds, a main line is provided between the bioreactor and a filter arrangement for filtration of the fermentation broth, which main line guides the main flow of fermentation broth. The filter arrangement serves here for cell removal and functions according to the principle of precoat filtration, for which a filter aid is to be suspended in the fermentation broth to be filtered, before the fermentation broth enriched with the filter aid passes into the filter arrangement as a suspension.

In the case of the known bioprocessing system, what is provided for the introduction of the filter aid is a mixing bag connected into a recirculation line. The use of such a mixing bag allows dust-free and largely contamination-free handling of the filter aid. The mixing bag and most of the remaining system components can be designed as single-use components, i.e., as disposable components. When the single-use components are appropriately exchanged, such a single-use concept fundamentally reduces the risk of cross-contamination between two successive batch processes.

However, challenges arise with respect to process automation in the addition of the filter aid, which takes place manually in the case of the known bioprocessing system. The manual, in particular physical, effort and time expenditure that are associated therewith are comparatively high, since the filter aid must be handled manually in a multiplicity of individual batches in the case of the known bioprocessing system.

However, challenges also arise with respect to the scalability of the amount of filter aid to be transferred, which amount is limited in the case of the known bioprocessing system because of the limited number of refill cycles and because of the limited accommodation volume of the mixing bag. Challenges lastly arise with respect to the regulatability of suspension of the filter aid in the fermentation broth, since suspension in the mixing bag in the case of the known system leads to a slow system response to a desired change in the concentration of the filter aid in the fermentation broth.

A plurality of powder transfer systems is known that fundamentally allow automated delivery of pulverulent media. However, these involve either delivery from one powder container into another powder container (EP 3 118 145 A1) or delivery from a powder container into a liquid container (U.S. Pat. No. 6,325,572 B2), and so these known powder transfer devices, as far as they are suitable at all for application to the bioprocessing system in question, fail to meet the above challenges for process automation.

SUMMARY

The problem addressed by the disclosure is that of configuring and developing the known bioprocessing system such that process automation is optimized while maintaining the single-use concept. Furthermore, the disclosure allows powder delivery, in particular dust-free powder delivery, that takes places virtually without any manual work steps. Moreover, the process time and the space requirement of the known bioprocessing solution can be shortened and reduced, respectively.

The above problem is solved in the case of a bioprocessing system according to the disclosure.

The main line, which inherently serves for conducting the main flow of fermentation broth or another liquid medium, in particular liquid biological medium, can be utilized for suspending or dissolving the filter aid or another additive in the liquid medium or the fermentation broth. What can be particularly advantageous in this connection is the fact that the flow state present anyway in the main line can be utilized for supporting the mixing between the additive and the liquid medium or between the filter aid and the fermentation broth.

Similarly, any other liquid such as, for example, tap water, sterile water, a buffer solution or the like could also be conducted through the main line as liquid medium and/or a substance to be dissolved such as, for example, buffer salt or pulverulent nutrient could be provided as pulverulent additive.

Provided downstream of the feed point for the additive can be a filter arrangement, as a system part to which it is possible to admit the liquid medium and through which it is possible in particular for the liquid medium to flow or into which the liquid medium can flow. In addition, what could be arranged downstream of the feed point and after dissolution or suspension of the additive, in addition to or as an alternative to a filter arrangement, is also another system part to which it is possible to admit the liquid medium, in particular an accommodation container such as a storage or mixing container for accommodation of the mixture just dissolved or suspended.

Specifically, what is proposed first of all very generally is that the bioprocessing system comprises a powder transfer system for metered delivery, in particular dust-free metered delivery, of an additive and a feed line which is connected to the powder transfer system and which opens into the main line at a feed point, wherein the feed line comprises a return flow preventer for prevention of a return flow of liquid medium. In some embodiments, the bioprocessing system comprises a powder transfer system for metered delivery, in particular dust-free metered delivery, of a filter aid and a feed line which is connected to the powder transfer system and which opens into the main line at a feed point, wherein the feed line comprises a return flow preventer for prevention of a return flow of fermentation broth.

Here, the feed line is a line in the actual sense, designed to conduct a fluid flow.

Furthermore, what is essential is that the powder transfer system feeds the additive into the feed line in powder form and drives it toward the feed point by means of a pressurized transport gas. The utilization of the pressurized transport gas to transport the additive allows, firstly, reliable passage of the additive through the return flow preventer and, secondly, reliable feeding of the additive into the main line, which guides the main flow of liquid medium. In some embodiments, the powder transfer system feeds the filter aid into the feed line in powder form and drives it toward the feed point by means of a pressurized transport gas. In this case, the utilization of the pressurized transport gas to transport the filter aid allows, firstly, reliable passage of the filter aid through the return flow preventer and, secondly, reliable feeding of the filter aid into the main line, which guides the main flow of fermentation broth.

According to the proposal, at least some of the thus fed additive is input into the liquid medium within the main line downstream of the feed point before the liquid medium enriched with the additive passes through or reaches the system part connected to the main line. In some embodiments, at least some of the thus fed filter aid is suspended in the fermentation broth within the main line downstream of the feed point before the fermentation broth enriched with the filter aid passes through the filter arrangement.

With the solution according to the proposal, a pulverulent additive can be added to the liquid medium in a dust- and contamination-free manner, since the subsystem between the powder transfer system and the feed point can be configured in a closed state in a simple manner. In some embodiments, a pulverulent filter aid can be added to the fermentation broth in a dust- and contamination-free manner.

Furthermore, the addition of the additive in accordance with the solution according to the proposal is readily automatable, since the metered delivery of the additive solely stems from appropriate actuation of a valve arrangement assigned to the powder transfer system. In some embodiments, the addition of the filter aid in accordance with the solution according to the proposal is readily automatable, since, in this case, the metered delivery of the filter aid solely stems from appropriate actuation of a valve arrangement assigned to the powder transfer system.

The solution according to the proposal is freely scalable with respect to the amount of the additive to be added, since the additive can be fed continuously to the powder transfer system without having to interrupt the operation of the bioprocessing system. In some embodiments, the solution according to the proposal is freely scalable with respect to the amount of the filter aid to be added, since, in this case, the filter aid can be fed continuously to the powder transfer system without having to interrupt the operation of the bioprocessing system.

Lastly, the response time of the bioprocessing system in the case of a desired change in the concentration of the additive in the liquid medium is extremely low, since the additive is fed directly into the main line from the powder transfer system via the feed line, i.e., without an interconnected mixing container. In some embodiments, the response time of the bioprocessing system in the case of a desired change in the concentration of the filter aid in the fermentation broth is extremely low, since, in this case, the filter aid is fed directly into the main line from the powder transfer system via the feed line, i.e., without an interconnected mixing container.

All of this lastly results in a particular advantage with respect to the above-discussed single-use concept in the solution according to the proposal. Because the return flow preventer rules out a return flow of liquid medium or fermentation broth in the direction of the powder transfer system, the connection of the powder transfer system at the feed line is always kept free of liquid medium or fermentation broth. This means that it is possible within the meaning of the single-use concept to exchange the feed line between two batch processes without the powder transfer system having to be cleaned for the respectively next batch process. The feed line can thus be readily designed as a single-use component, whereas the powder transfer system can be utilized multiple times without the customarily required cleaning effort.

In some embodiments, the liquid medium is fermentation broth and/or the system part connected to the main line is a bioprocessing functional element, such as a filter arrangement for filtration of the fermentation broth or an accommodation container for accommodation of the liquid medium, and/or the additive is a filter aid and/or salt and/or nutrient.

In various embodiments, according to which the liquid medium is fermentation broth, the system part connected to the main line is a filter arrangement for filtration of the fermentation broth and the additive is a filter aid.

In various embodiments, the bioprocessing system comprises a liquid storage container, in particular a bioreactor, wherein the bioreactor can include, according to the above-discussed single-use concept, an assigned bioprocess bag. In principle, the bioprocessing system can, however, also comprise other components such as, for example, process mixing systems which can serve for mixing of powders, suspensions, solutions or emulsions.

According to various embodiment, the single-use concept can encompass not only the feed line including the return flow preventer, but also the main line including the main flow pump. In principle, this also concerns the bioreactor, if it comprises an assigned bioprocess bag.

In some embodiments, the powder transfer system is equipped with a transport gas source for the pressurized transport gas, which can be a pressure container for the transport gas or a feed pump for the transport gas. In addition, the feeding of the additive or filter aid into the feed line can be discontinuous or continuous. The mode of operation that is chosen here is dependent on the specified tolerance with respect to concentration fluctuations of the additive in the liquid medium or of the filter aid in the fermentation broth.

According to various embodiments, the return flow preventer of the feed line is constructed in the manner of a check valve, in which a deforming and/or movable valve body is provided. This allows a purely mechanical structure of the return flow preventer, which simplifies the structure of the bioprocessing system in terms of control. In principle, the return flow preventer can, however, also comprise an electrically actuatable valve arrangement, which switches to a pressure gradient at the connections of the return flow preventer in order to prevent the return flow of liquid medium or fermentation broth.

According to various embodiments, the arrangement can be provided such that the feed line is always free of liquid medium or fermentation broth between the powder transfer system and the return flow preventer. This requires an appropriate leak-tightness of the return flow preventer. In addition the feed line can be free of liquid medium or fermentation broth between the return flow preventer and the feed point at least in the case of a steady main flow, in any case in a line section of the feed line that adjoins to the return flow preventer. This is especially the case when the section of the feed line that is on the feed point side in relation to the return flow preventer has a certain minimum length, such that, in said section of the feed line, the liquid medium or the fermentation broth cannot rise as far as the return flow preventer. The term "steady main flow" means the state to which the main flow has adjusted after a change in the pump output of the main flow pump, in particular after the main flow pump has been switched on.

As discussed above, the suspension or dissolution of the additive in the liquid medium or of the filter aid in the fermentation broth at least partially stems from the liquid flow or the inevitable turbulences of the liquid flow in the main line. In some embodiments, it is additionally the case in one alternative that the suspension or dissolution of the additive in the liquid medium or of the filter aid in the fermentation broth also stems from the liquid flow or turbulences in the main flow pump.

In some embodiments, the suspension or dissolution of the additive in the liquid medium or of the filter aid in the fermentation broth in the main line is supported by equipping the interior of the main line with mixing shapes in the form of flow guiding profiles, baffles or the like. If the main line is designed as a single-use component composed of a plastics material, this can be realized using simple manufacturing means.

Depending on, firstly, the liquid medium or fermentation broth and, secondly, the additive or filter aid, sufficient mixing of the additive and the liquid medium or of the filter aid and the fermentation broth in the short section of the main line between the feed point and the system part connected to the main line or the filter arrangement may not yet have taken place. What can be provided for this purpose according to some embodiments is that recirculation of the liquid medium or the fermentation broth is initiated via an actuatable valve arrangement. The purpose of the recirculation is that, in the event of incomplete suspension or dissolution of the additive or filter aid, recycling into a liquid storage container provided with a stirrer, in particular into a stirred bioreactor, can first finish the suspension or dissolution step before the flow direction is switched and a switch is thereby made from recirculation to filtration in particular. Inter alia for this purpose, the bioprocessing system is equipped with a control arrangement according to some embodiments, by which the valve arrangement is accordingly actuatable.

Some embodiments relate from the start to a regulated actuation of the powder transfer system and/or of the valve arrangement relating to recirculation and/or of the main flow pump depending on the sensor values of a sensor arrangement which ascertains a characteristic of the liquid medium enriched by the additive or of the fermentation broth enriched by the filter aid. This means that it is, for example, possible to switch on or switch off the recirculation depending on the concentration of the additive or filter aid.

According to some embodiments, a method for operation of the bioprocessing system according to the proposal is disclosed.

The method according to the proposal is that the additive or the filter aid can be fed into the feed line in powder form by means of the powder transfer system and it is driven toward the feed point by means of a pressurized transport gas and that at least some of the fed additive or filter aid is suspended or dissolved in the liquid medium or in the fermentation broth, respectively, within the main line downstream of the feed point before the liquid medium enriched with the additive or the fermentation broth enriched with the filter aid passes through or reaches the system part connected to the main line or the filter arrangement. In view of the fact that the method according to the proposal relates to the mode of operation of the bioprocessing system according to the proposal, reference may be made to all relevant remarks in relation to the first-mentioned teaching.

Some embodiments relate to a specific mode of operation of the main flow pump, such that an undesired flow through the return flow preventer is avoided.

According to some embodiments, the use of a sterile-packed transfer set composed of prefabricated system components for construction of a bioprocessing system according to the proposal is disclosed.

The transfer set in the sterile packaging can include at least the feed line including the return flow preventer. For the assembly of the bioprocessing system, the transfer set is unpacked, i.e., removed from the packaging, and connected to the bioprocessing system in addition. If the transfer set only comprises the feed line including the return flow preventer, the connection of the transfer set is limited, firstly, to the powder transfer system and, secondly, to the main line, at the feed point there.

With the use according to the proposal, it has been identified that the bioprocessing system according to the proposal is, especially owing to the return flow preventer, particularly highly suited to the realization of the above-discussed single-use concept. This concerns at least the feed line including the return flow preventer.

In some embodiments, the single-use concept can, however, also be applied to the components of the main line and to the liquid storage container, in particular bioreactor, or the bioprocess bag. If multiple system components are assigned to the transfer set, the prefabrication can encompass the joining of the system components to one another, and so the connection of the transfer set to the bioprocessing plant in addition is simplified.

In some embodiments, the system components assigned to the transfer set can be designed as single-use components, which, as explained above, can be further formed from a plastics material.

Apart from that, with respect to the use according to the proposal, reference may be made to all remarks in relation to the first-mentioned teaching.

Various embodiments provide a bioprocessing system comprising a main line for conduction of a main flow of a liquid, in particular biological, medium, a main flow pump for generation of the main flow and a system part connected to the main line, wherein the bioprocessing system further comprises a powder transfer system for metered delivery, in particular dust-free metered delivery, of an additive and a feed line which is connected to the powder transfer system and which opens into the main line at a feed point and which comprises a return flow preventer for prevention of a return flow of liquid medium, wherein the powder transfer system feeds the additive into the feed line in powder form and drives it toward the feed point by a pressurized transport gas and wherein at least some of the fed additive is input into the liquid medium within the main line downstream of the feed point before the liquid medium enriched with the additive passes through or reaches the system part connected to the main line.

In various embodiments, the liquid medium is fermentation broth, and/or, wherein the system part connected to the main line is a bioprocessing functional element, such as a filter arrangement for filtration of the fermentation broth or an accommodation container for accommodation of the liquid medium, and/or, in that the additive is a filter aid and/or salt and/or nutrient.

In various embodiments, having a main line for conduction of a main flow of fermentation broth, having a main flow pump for generation of the main flow and having a filter arrangement connected to the main line for filtration of the fermentation broth, wherein the bioprocessing system comprises a powder transfer system for metered delivery, in particular dust-free metered delivery, of a filter aid and a feed line which is connected to the powder transfer system and which opens into the main line at a feed point and which comprises a return flow preventer for prevention of a return flow of fermentation broth, wherein the powder transfer system feeds the filter aid into the feed line in powder form and drives it toward the feed point by means of a pressurized transport gas and wherein at least some of the fed filter aid is suspended in the fermentation broth within the main line downstream of the feed point before the fermentation broth enriched with the filter aid passes through the filter arrangement.

In various embodiments, the bioprocessing system comprises a liquid storage container, in particular a bioreactor, in particular a bioreactor having an assigned bioprocess bag, and in that the liquid medium is fed from the liquid storage container into the feed point via the main line.

In various embodiments, the feed line and/or the main line and/or the return flow preventer and/or the main flow pump, in particular as single-use component, is/are formed at least in part, such as predominantly, from a plastics material, such as flexible plastics material, such as from a silicone material and/or from a polymer material, in particular PE (polyethylene), PP (polypropylene), PTFE (polytetrafluoroethylene), PBT (polybutylene terephthalate), PSU (polysulfone), PESU (polyether sulfone), PC (polycarbonate).

In various embodiments, the powder transfer system comprises a transport gas source for the pressurized transport gas and in that the powder transfer system feeds the additive into the feed line by means of the pressurized transport gas, wherein the powder transfer system feeds the additive discontinuously into the feed line or in that the powder transfer system feeds the additive continuously into the feed line.

In various embodiments, the return flow preventer blocks fluid flow in the direction of the powder transfer system and, upon exceeding of a switching pressure gradient in the flow direction of the return flow preventer, lets through a flow of the additive, in particular a flow of filter aid, in the direction of the main line and/or in that the return flow preventer is constructed in the manner of a check valve and comprises a valve body which is spring-elastic or is spring-preloaded by means of a spring arrangement.

In various embodiments, the feed line is always free of liquid medium between the powder transfer system and the return flow preventer, wherein the feed line is free of liquid medium between the return flow preventer and the feed point at least in the case of a steady main flow.

In various embodiments, the additive is suspended or dissolved in the liquid medium, wherein the suspension or dissolution of the additive in the liquid medium stems from the liquid flow in the main line and/or in the main flow pump, wherein the main line comprises at least one mixing section, in particular downstream of the feed point, and in that the main line comprises mixing shapes in the form of flow guiding profiles, baffles or the like in the mixing section.

In various embodiments, the main line comprises, on the entry side of the system part connected to the main line, an actuatable valve arrangement via which the liquid medium is recirculatable, in particular back into the liquid storage container, wherein the valve arrangement is actuatable via control signals.

In various embodiments, the bioprocessing system comprises a control arrangement and in that the powder transfer system and/or the valve arrangement relating to recirculation and/or the main flow pump is/are actuatable by the control arrangement.

In various embodiments, a sensor arrangement which ascertains a characteristic of the liquid medium enriched by the additive is provided and in that the control arrangement actuates the powder transfer system and/or the valve arrangement relating to recirculation and/or the main flow pump depending on the sensor values of the sensor arrangement, wherein the characteristic ascertained is the concentration of the additive in the liquid medium and/or the temporal course of the concentration of the additive in the liquid medium and/or the input pressure or pressure profile, in particular in the main line.

In various embodiments, the additive is fed into the feed line in powder form by means of the powder transfer system and it is driven toward the feed point by means of a pressurized transport gas and in that at least some of the fed additive is delivered into the liquid medium within the main line downstream of the feed point before the liquid medium enriched with the additive passes through or reaches the system part connected to the main line.

In various embodiments, the main flow pump is operated such that the switching pressure gradient in the flow direction of the return flow preventer is always fallen short of.

Various embodiments provide the use of a sterile-packed transfer set composed of prefabricated system components for construction of a bioprocessing system as described herein, wherein the transfer set in the sterile packaging comprises at least the feed line including the return flow preventer.

In various embodiments, the transfer set in the sterile packaging additionally comprises the main line, such as including the main flow pump, which is connected to the feed line in a prefabricated manner at the feed point, wherein the transfer set in the sterile packaging comprises at least part of the liquid storage container, in particular of the bioreactor, in particular a bioprocess bag assigned to the bioreactor, which is connected to the main line in a prefabricated manner at the feed point.

In various embodiments, the feed line and/or the main line and/or the return flow preventer and/or the main flow pump, in particular as single-use component, is/are formed at least in part, such as predominantly, from a plastics material, such as flexible plastics material, such as from a silicone material and/or from a polymer material, in particular PE (polyethylene), PP (polypropylene), PTFE (polytetrafluoroethylene), PBT (polybutylene terephthalate), PSU (polysulfone), PESU (polyether sulfone), PC (polycarbonate).

BRIEF DESCRIPTION OF THE DRAWINGS

Aspects of the disclosure will be more particularly elucidated below on the basis of a drawing depicting merely an exemplary embodiment. In the drawing.

DETAILED DESCRIPTION

To begin with, it must be pointed out that the drawing only shows the components of the bioprocessing system 1 according to the proposal that are necessary for the elucidation of the teachings. Accordingly, the depiction of a plurality of additionally provided valves, sensors or the like has been dispensed with for good clarity.

In this exemplary embodiment, the focus is the suspension of filter aids. However, this should not be understood as limiting. In principle, the addition of other additives 47, in particular a salt and/or nutrient in the case of buffer or media production, is instead also a conceivable application.

Figure 1:
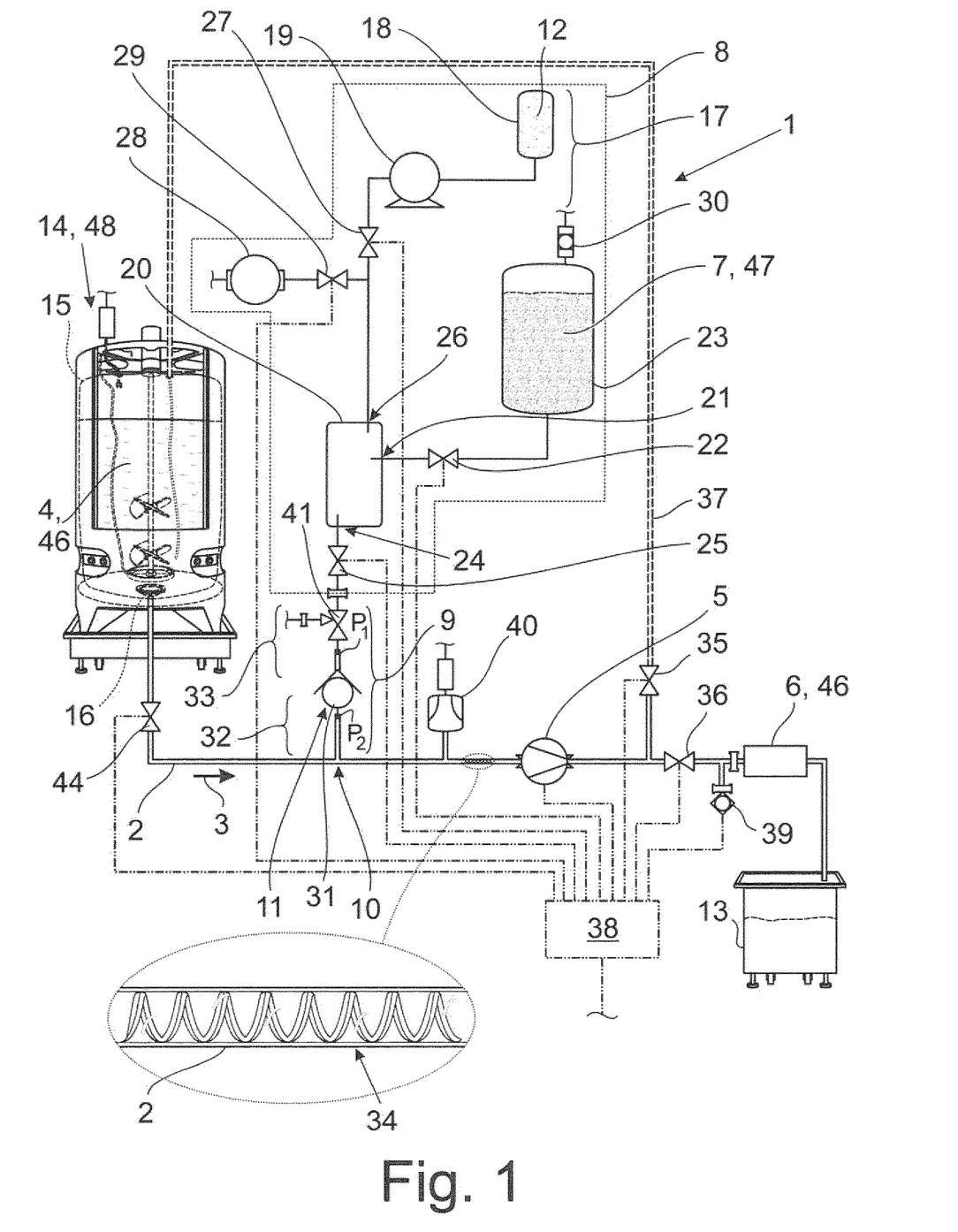
FIG. 1 shows a schematic depiction of a bioprocessing system according to the proposal.

The bioprocessing system 1 shown in FIG. 1 is equipped with a main line 2 for conduction of a main flow 3 of fermentation broth 4, with a main flow pump 5 for generation of the main flow 3 and with a filter arrangement 6 connected to the main line 2 for filtration of the fermentation broth 4.

Instead of fermentation broth 4, a different liquid medium 45 can also be provided in a different application.

Furthermore, instead of a filter arrangement 6, a different system part 46 connected to the main line 2 can also be provided in a different application, to which it is possible to admit the liquid medium, for example such that it is possible for the liquid medium to flow therethrough or such that the liquid medium can flow thereinto.

The filter arrangement 6 functions according to the principle of precoat filtration. This means that a filter aid 7 is to be suspended in the fermentation broth 4 as additive before the fermentation broth 4 enriched with the filter aid 7 passes through the filter arrangement 6.

What is essential then is that the bioprocessing system 1 comprises for this purpose a powder transfer system 8 for metered delivery, in particular dust-free metered delivery, of the filter aid 7 and a feed line 9 which is connected to the powder transfer system 8 and which opens into the main line 2 at a feed point 10. FIG. 1 shows that the feed line 9 comprises a return flow preventer 11 for prevention of a return flow of fermentation broth 4. This ensures that the feed line 9 is free of fermentation broth 4 between the powder transfer system 8 and the return flow preventer 11. This is an important aspect for the realization of the above single-use concept, as will be explained.

What is furthermore essential is that the powder transfer system 8 feeds the filter aid 7 into the feed line 9 in powder form and drives it toward the feed point 10 and in particular beyond the feed point 10 into the main line 2 by means of a pressurized transport gas 12. What thus takes place is a flow of transport gas 12 and filter aid 7 from the powder transfer system 8 toward the feed point 10 that ensures that the filter aid 7 enters the main line 2 through which the fermentation broth 4 flows. As a consequence, at least some of the fed filter aid 7 is suspended in the fermentation broth 4 within the main line 2 downstream of the feed point 10 before the fermentation broth 4 enriched with the filter aid 7 passes through the filter arrangement 6.

After passage through the filter arrangement 6, the filtered fermentation broth 4 is processed further, disposed of or recycled, depending on the application area. For the purpose of a simple depiction, FIG. 1 merely shows a collection container 13 for the filtered fermentation broth, which is not to be understood as limiting.

A look at the depiction according to FIG. 1 shows that the addition of the filter aid 7 is only effected via the feed line 9 and thus without any mixing chambers, meaning that a change in the metering of the filter aid 7 by the powder transfer system 8 has a virtually immediate effect on the concentration of the filter aid 7 in the fermentation broth 4. The response time of the bioprocessing system 1 to a change in the metering of the filter aid 7 is thus advantageously short.

In an embodiment, the bioprocessing system 1 is equipped with a bioreactor 14 which generates the fermentation broth 4 and which, in a further embodiment, comprises an assigned bioprocess bag 15 for accommodation of the fermentation broth 4. The drain port 16 of the bioreactor 14 is connected to the main line 2. From the bioreactor (14), the fermentation broth 4 is fed into the feed point 10 via the main line 2.

Instead of a bioreactor 14, a different liquid storage container 48 can also be provided in a different application.

For the purpose of realizing the above single-use concept, it can be the case that the feed line 9 and/or the main line 2 and/or the return flow preventer 11 and/or the main flow pump 5 is/are designed as a single-use component or as single-use components. In an embodiment, at least one of these components is formed at least in part, such as predominantly, from a plastics material, such as from a silicone material and/or from a polymer material, in particular PE (polyethylene), PP (polypropylene), PTFE (polytetrafluoroethylene), PBT (polybutylene terephthalate), PSU (polysulfone), PESU (polyether sulfone), PC (polycarbonate).

The use of transfer sets composed of such single-use components for construction of the bioprocessing system 1 according to the proposal is the subject matter of a further teaching, which will be discussed below.

For the design of the powder transfer system 8, various advantageous variants are conceivable. In various embodiments, the powder transfer system 8 comprises a transport gas source 17 for the pressurized transport gas 12, wherein the powder transfer system 8 feeds the filter aid 7 into the feed line 9 by means of the pressurized transport gas 12. Specifically, the transport gas source 17 comprises, here, a transport gas reservoir 18 and a compressor 19. The compressor 19 pumps the transport gas 12 for addition of the filter aid 7 through a powder chamber 20 filled with filter aid 7 such that the filter aid 7 is, as discussed above, fed into the feed line 9 by means of the pressurized transport gas 12. The transport gas 12 can be an inert gas, for example nitrogen. In principle, the transport gas 12 can, however, also simply be air.

The powder chamber 20 comprises a powder inlet 21, which is connected to a powder reservoir 23 via an actuatable valve 22 assigned to the powder inlet 21. The powder chamber 20 furthermore comprises a powder outlet 24, which has assigned thereto an actuatable valve 25, which in turn is connected to the feed line 9. Lastly, the powder chamber 20 comprises a gas connection 26, to which the compressor 19 can be switched via an actuatable valve 27 assigned to the compressor 19. In addition, a vacuum pump 28 is switched to the connection 26 via an actuatable valve 29 assigned to the vacuum pump 28.

For the filling of the powder chamber 20, the valve 25 assigned to the powder outlet 24 and the valve 27 assigned to the compressor 19 are closed, whereas the valve 29 assigned to the vacuum pump 28 and the valve 22 assigned to the powder inlet 21 are open. In this state, the operation of the vacuum pump 28 leads to suction of filter aid 7 from the powder reservoir 23 via the valve 22 assigned to the powder inlet 21. It is assumed here for the sake of simplicity that, in view of the large volume of the powder reservoir 23, there is initially no need for subsequent flow of gas into the powder reservoir 23.

After the filling of the powder chamber 20, the valve 29 assigned to the vacuum pump 28 is closed, whereas the valve 25 assigned to the powder outlet 24 and the valve 27 assigned to the compressor 19 are open. Subsequent actuation of the compressor 19 leads to flow of transport gas 12 through the powder chamber 20 from the transport gas reservoir 18, the result being that the filter aid 7 now present in the powder chamber 20 is, as discussed above, fed into the feed line 9 and, driven by the pressurized transport gas 12, reaches the feed point 10.

The above-described operation can be repeated until the respectively provided amount of filter aid 7 has been fed into the main line 2.

Very generally, it is the case, here, that the filter aid 7 is fed discontinuously into the feed line 9 and thus into the main line 2 by means of the powder transfer system 8. This can be easily realized with the simple structure depicted in the drawing. Alternatively, the powder transfer system 8 can feed the filter aid 7 virtually continuously into the feed line 9.

It has already been pointed out that the return flow preventer 11 of the feed line 9 is of particular significance in the solution according to the proposal. The return flow preventer 11 blocks a fluid flow in the direction of the powder transfer system 8. Upon exceeding of a switching pressure gradient in the flow direction of the return flow preventer 11, the return flow preventer 11 lets through a flow of filter aid in the direction of the main line 2. The pressure gradient arises from the difference between the pressure $P_1$ prevailing in the feed line 9 above the return flow preventer 11 in FIG. 1 and the pressure $P_2$ prevailing in the feed line 9 below the return flow preventer 11. In this case, the return flow preventer 11 only falls into the flow state when the pressure gradient in the flow direction reaches the predetermined switching pressure gradient. Depending on the design of the return flow preventer 11, a switching pressure gradient of differing magnitude can be present.

A particularly simple embodiment of the return flow preventer 11 arises by the return flow preventer 11 being constructed in the manner of a check valve and comprising a valve body 31 which is spring-elastic or is spring-preloaded by means of a spring arrangement.

In the first-mentioned variant, the return flow preventer 11 can, for example, be designed as a lip valve in which lips formed in the valve body 31 open or close depending on the direction of flow. In the case of the embodiment of the return flow preventer 11 having a spring-preloaded valve body, the valve body can, for example, be designed as a flap valve, as a ball or the like.

In an embodiment, the return flow preventer 11 is designed such that the feed line 9 is always free of fermentation broth 4 between the powder transfer system 8 and the return flow preventer 11. In addition, it can be the case that the feed line 9 is free of fermentation broth 4 between the return flow preventer 11 and the feed point 10 at least in the case of a steady main flow 3. It becomes apparent here that the lower section 32 in FIG. 1 of the feed line 9, i.e., the section between the return flow preventer 11 and the feed point 10, can have a certain minimum length in order to reliably prevent fermentation broth 4 from getting into the upper section 33 in FIG. 1 of the feed line, i.e., into the section 33 between the return flow preventer 11 and the powder transfer system 8, via the return flow preventer 11 in the event of an incomplete closure of the return flow preventer 11.

Nevertheless, it must be pointed out that in principle the feed line 9 manages even without the lower section 32 and/or without the upper section 33. In extreme cases, the feed line 9 can even be provided solely by the return flow preventer 11.

Here, the suspension of the filter aid 7 in the fermentation broth 4 stems from the liquid flow in the main line 2 and/or in the main flow pump 5. Especially the flow turbulences arising in the main flow pump 5 lead to particularly good mixing of the filter aid 7 with the fermentation broth 4, and so the path between the feed point 10 and the filter arrangement 6 can ensure sufficient mixing. In various embodiments, the mixing in the main line 2 is further supported by the main line 2 comprising at least one mixing section, in particular downstream of the feed point 10, wherein the main line 2 comprises mixing shapes 34 in the form of flow guiding profiles, baffles or the like in the mixing section. In the exemplary embodiment depicted in FIG. 1, this has been realized by helical mixing shapes 34, in particular in the manner of a static mixer as is known in the case of two-component mixers for example. Said mixing shapes 34 can, for example, be realized as a plastics helix inserted into the main line 2, which can be realized in a simple manner with respect to production. In addition, the mixing shape can be arranged both upstream and downstream of the main flow pump 5.

Alternatively or additionally, the main line 2 can comprise, on the entry side of the filter arrangement 6, an actuatable valve arrangement 35, 36 via which the fermentation broth 4, here, is recirculatable back into the bioreactor 14. An appropriate recirculation line 37 which is guided back into the bioreactor 14 is shown by the dashed line in FIG. 1. Recirculation is triggered by opening of the valve 35 and closing of the valve 36.

Here, the bioprocessing system 1 depicted comprises a control arrangement 38, wherein the powder transfer system 8 and/or the valve arrangement 35, 36 relating to recirculation and/or the main flow pump 5 is/are actuatable by the control arrangement 38. The control arrangement 38 can be an electronic control arrangement, which further has control software running thereon.

With the control arrangement 38, the operation of the bioprocessing system 1 according to the proposal can be automated within wide limits. This concerns in particular the automation of the addition of the filter aid 7. Provided for this purpose can be a sensor arrangement 39, which can ascertain a characteristic of the fermentation broth 4 enriched by the filter aid 7. This could be, for example, a measurement of concentration, turbidity or viscosity. Such a sensor arrangement 39 is immediately upstream of the filter arrangement 6 in FIG. 1. The sensor arrangement 39 can in principle comprise a plurality of sensors distributed in the bioprocessing system 1.

It can be the case that the control arrangement 38 actuates the powder transfer system 8 and/or the valve arrangement 35, 36 relating to recirculation and/or the main flow pump 5 depending on the sensor values of the sensor arrangement 39. In an embodiment, the characteristic ascertained is the concentration of the filter aid 7 in the fermentation broth 4 and/or the temporal course of the concentration of the filter aid 7 in the fermentation broth 4. If, for example, the concentration of the filter aid 7 in the fermentation broth 4 drops below a predetermined threshold, the control arrangement 38 actuates the powder transfer system 8 to add additional filter aid 7. Alternatively, the input pressure or pressure profile, in particular in the main line 2, can be used as a control variable within the meaning of the above characteristic. This means that the amount of filter aid can be dynamically adjusted to the pressure profile in accordance with a dynamic precoat filtration. This is achieved by an appropriate actuation of the valves 25, 27 and 29, as has been elucidated above. A further control variable for filter aid metering is the weighing of the filter aid in the storage container.

Alternatively or additionally, the sensor arrangement 39 can capture the volume flow rate of the fermentation broth 4 through the main line 2 and control the addition of the filter aid 7 depending on the volume flow rate ascertained.

It has been elucidated above that the addition of the filter aid 7 according to the proposal is effected by means of a pressurized transport gas 12. Depending on the design of the conduction system of the bioprocessing system 1, it may be necessary to provide a counterbalance system 40 in order to absorb the energy of the transport gas 12 introduced into the conduction system without excessive mechanical loading of the conduction system.

The counterbalance system 40 can be, for example, a simple counterbalance container, as indicated in FIG. 1. Specifically, the counterbalance system 40 shown in FIG. 1 comprises not only the counterbalance container, but also a venting filter, via which the transport gas 12 is discharged from the system. What is avoided as a result is that the transport gas 12 adversely affects the precoat filtration and the formation of a suitable filter cake. The counterbalance container acts in a way as a "gas trap".

The counterbalance container of the counterbalance system 40 can be a stirring bag in order to keep the suspended particles of the filter aid 7 floating.

Alternatively, in the case of the addition of filter aid 7 according to the proposal by means of the powder transfer system 8, the recirculation line 37 can also be always activated by means of the valve arrangement 35, 36, so that the transport gas 12 gets into the bioreactor 14, where it is discharged via the exhaust port.

It must be additionally pointed out that a further actuatable valve 44 is provided at the lower outlet of the bioreactor 14, which valve ensures in the steady state that the hydrostatic pressure of the fermentation broth 4 in the bioreactor 14 is not applied to the main line 2.

According to a further teaching a method for operation of a bioprocessing system 1 according to the proposal is disclosed.

According to the method according to the proposal, it is the case that the filter aid 7 is fed into the feed line 9 in powder form by means of the powder transfer system 8 and is driven toward the feed point 10 by means of a pressurized transport gas 12. In this connection, at least some of the fed filter aid 7 is suspended in the fermentation broth 4 within the main line 2 downstream of the feed point 10 before the fermentation broth 4 enriched with the filter aid 7 passes through the filter arrangement 6. Reference may be made to all above remarks in relation to the mode of operation of the bioprocessing system 1 according to the proposal.

The method according to the proposal concerns in particular the actuation of components such as the powder transfer system 8, the main flow pump 5 or the like. Specifically, the above-discussed variants of actuation of the powder transfer system 8 by means of the control arrangement 38 are part of the method according to the proposal.

Before the specific realization of the single-use concept is addressed, a measure concerning the multiple use of the powder transfer system 8 must be additionally pointed out. In the case of the exemplary embodiment depicted in FIG. 1, it is namely the case that the feed line 9 comprises a steam-to-valve 41 (STV) in the upper section 33, i.e., between the return flow preventer 11 and the powder transfer system 8. Very generally, a steam-to-valve joins a disposable component, such as the feed line 9, to a reusable component, such as the powder transfer system 8, it being possible for the reusable component to be sterilized with steam before the start of the process via the steam-to-valve, in order to subsequently establish joining with the disposable component, which can be further provided in a gamma-sterilized state.

It is presently thus the case that the steam-to-valve 41 allows steam sterilization of the connection of the powder transfer system 8 before and/or after the addition of filter aid 7. This further reduces the risk of contamination even after the feed line 9 has been exchanged.

According to a further teaching the use of a sterile-packed transfer set 42 composed of prefabricated system components for construction of a bioprocessing system 1 according to the proposal disclosed.

Figure 2:
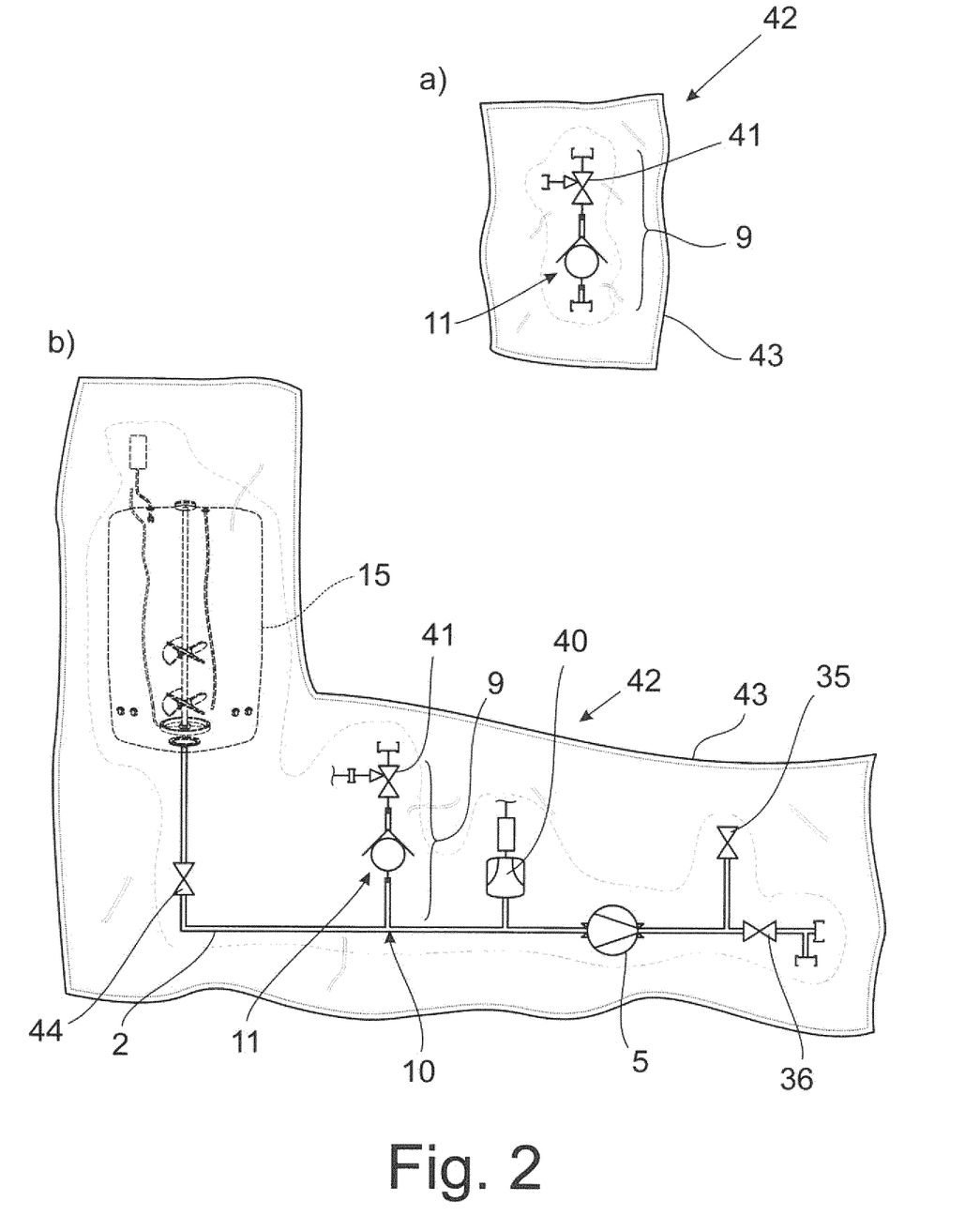
FIG. 2 shows a) a first embodiment and b) a second embodiment of a sterile-packed transfer set for the use according to the proposal for construction of a bioprocessing system according to the proposal.

After the transfer set 42 has been unpacked from the packaging 43, the transfer set is connected to the bioprocessing system 1 in addition.

Alternatively, the transfer set 42 can consist of multiple individual-component sets, which are joined to one another with the aid of sterile connectors upon construction. What is then assigned to the individual-component sets in each case is a separate piece of sterile subpackaging.

Two variants for a transfer set 42 to be used can be gathered from the depiction according to FIG. 2. According to the use according to the proposal, the transfer set 42 in the sterile packaging 43 comprises at least the feed line 9 including the return flow preventer 11. In the case of the exemplary embodiment shown in FIG. 2a, the above-discussed steam-to-valve 41 is additionally assigned to the feed line 9.

In addition, the transfer set 42 in the sterile packaging 43 can additionally comprise the main line 2, here including the main flow pump 5, which is connected to the feed line 9 in a prefabricated manner at the feed point 10. Further, the transfer set 42 in the sterile packaging 43 can comprise at least part of the bioreactor 14, here a bioprocess bag 15 assigned to the bioreactor 14, which is connected to the main line 2 in a prefabricated manner at the feed point 10.

In an embodiment, the system components assigned to the transfer set 42 are single-use components. This concerns the feed line 9 and/or the main line 2 and/or the return flow preventer 11 and/or the main flow pump 5. In an embodiment, the components assigned to the transfer set 42 are formed at least in part, such as predominantly, from a plastics material, such as flexible plastics material, such as from a silicone material and/or from a polymer material, in particular PE (polyethylene), PP (polypropylene), PTFE (polytetrafluoroethylene), PBT (polybutylene terephthalate), PSU (polysulfone), PESU (polyether sulfone), PC (polycarbonate). In this respect too, reference may be made to the remarks in relation to the bioprocessing system 1 according to the proposal.

The invention claimed is:

1. A bioprocessing system comprising:
   a main line for conduction of a main flow of a liquid medium,
   a main flow pump for generation of the main flow, and
   a system part connected to the main line,
   wherein the bioprocessing system further comprises:

a powder transfer system for metered delivery, in particular dust-free metered delivery, of an additive, and a feed line which is connected to the powder transfer system and which opens into the main line at a feed point and which comprises a return flow preventer for prevention of a return flow of liquid medium, wherein the powder transfer system feeds the additive into the feed line in powder form and drives it toward the feed point by a pressurized transport gas and wherein at least some of the additive is input into the liquid medium within the main line downstream of the feed point before the liquid medium enriched with the additive passes through or reaches the system part connected to the main line;

wherein the powder transfer system comprises a transport gas source for the pressurized transport gas and wherein the powder transfer system feeds the additive into the feed line by the pressurized transport gas.

2. The bioprocessing system as claimed in claim 1, wherein the liquid medium is fermentation broth, and/or, wherein the system part connected to the main line is a bioprocessing functional element for filtration of the fermentation broth or an accommodation container for accommodation of the liquid medium, and/or, wherein the additive is a filter aid and/or salt and/or nutrient.

3. The bioprocessing system as claimed in claim 2, wherein the bioprocessing system comprises the powder transfer system for dust-free metered delivery, of a filter aid and the feed line which is connected to the powder transfer system and which opens into the main line at the feed point and which comprises the return flow preventer for prevention of a return flow of fermentation broth, wherein the powder transfer system feeds the filter aid into the feed line in powder form and drives it toward the feed point by the pressurized transport gas and wherein at least some of the filter aid is suspended in the fermentation broth within the main line downstream of the feed point before the fermentation broth enriched with the filter aid passes through a filter arrangement.

4. The bioprocessing system as claimed in claim 1, wherein the bioprocessing system comprises a liquid storage container, and wherein the liquid medium is fed from the liquid storage container into the feed point via the main line.

5. The bioprocessing system as claimed in claim 1, wherein the feed line and/or the main line and/or the return flow preventer and/or the main flow pump, as single-use component, is/are formed at least in part from a plastics material, and/or from a polymer material.

6. The bioprocessing system as claimed in claim 1, wherein the return flow preventer blocks fluid flow in the direction of the powder transfer system and, upon exceeding of a switching pressure gradient in the flow direction of the return flow preventer, lets through a flow of the additive in the direction of the main line and/or wherein the return flow preventer is constructed in the manner of a check valve and comprises a valve body which is spring-elastic or is spring-preloaded by a spring arrangement.

7. The bioprocessing system as claimed in claim 1, wherein the feed line is always free of liquid medium between the powder transfer system and the return flow preventer.

8. The bioprocessing system as claimed in claim 1, wherein the additive is suspended or dissolved in the liquid medium.

9. The bioprocessing system as claimed in claim 1, wherein the main line comprises, on an entry side of the system part connected to the main line, an actuatable valve arrangement via which the liquid medium is recirculatable.

10. The bioprocessing system as claimed in claim 9, wherein the bioprocessing system comprises a control arrangement and wherein the powder transfer system and/or the valve arrangement relating to recirculation and/or the main flow pump is/are actuatable by the control arrangement.

11. The bioprocessing system as claimed in claim 10, wherein a sensor arrangement which ascertains a characteristic of the liquid medium enriched by the additive is provided and wherein the control arrangement actuates the powder transfer system and/or the valve arrangement relating to recirculation and/or the main flow pump depending on one or more sensor values of the sensor arrangement, wherein the characteristic ascertained is the concentration of the additive in the liquid medium and/or a temporal course of the concentration of the additive in the liquid medium and/or an input pressure or pressure profile in the main line.

12. A method for operation of a bioprocessing system as claimed in claim 1, wherein the additive is fed into the feed line in powder form by the powder transfer system and it is driven toward the feed point by a pressurized transport gas and wherein at least some of the additive is delivered into the liquid medium within the main line downstream of the feed point before the liquid medium enriched with the additive passes through or reaches the system part connected to the main line.

13. The method as claimed in claim 12, wherein the main flow pump is operated such that a switching pressure gradient in the flow direction of the return flow preventer is always fallen short of.

14. A use of a sterile-packed transfer set composed of prefabricated system components for construction of a bioprocessing system as claimed in claim 1, wherein the transfer set in the sterile packaging comprises at least the feed line including the return flow preventer.

15. The use as claimed in claim 14, wherein the transfer set in the sterile packaging additionally comprises the main line which is connected to the feed line in a prefabricated manner at the feed point, wherein the transfer set in the sterile packaging comprises at least part of the liquid storage container, which is connected to the main line in a prefabricated manner at the feed point.

16. The use as claimed in claim 14, wherein the feed line and/or the main line and/or the return flow preventer and/or the main flow pump is/are formed at least in part from a plastics material and/or from a polymer material.

17. The bioprocessing system as claimed in claim 1, wherein the powder transfer system comprises a transport gas source for the pressurized transport gas and wherein the powder transfer system feeds the additive into the feed line by the pressurized transport gas, wherein the powder transfer system feeds the additive discontinuously into the feed line or wherein the powder transfer system feeds the additive continuously into the feed line.

18. The bioprocessing system as claimed in claim 1, wherein the feed line is always free of liquid medium between the powder transfer system and the return flow preventer, wherein the feed line is free of liquid medium between the return flow preventer and the feed point at least in the case of a steady main flow.

19. The bioprocessing system as claimed in claim 1, wherein the additive is suspended or dissolved in the liquid medium, wherein the suspension or dissolution of the additive in the liquid medium stems from the liquid flow in the main line and/or in the main flow pump, wherein the main line comprises at least one mixing section downstream of the feed point, and wherein the main line comprises mixing shapes in the form of flow guiding profiles, baffles or the like in the mixing section.

20. The bioprocessing system as claimed in claim 1, wherein the powder transfer system feeds the additive discontinuously into the feed line or in that the powder transfer system feeds the additive continuously into the feed line.

* * * * *